(12) United States Patent
Brandt et al.

(10) Patent No.: US 11,317,658 B2
(45) Date of Patent: May 3, 2022

(54) SUPPORT GARMENT

(71) Applicant: NIKE, Inc., Beaverton, OR (US)

(72) Inventors: Baron C. Brandt, Portland, OR (US);
Daniela Grogro, Portland, OR (US);
Iustinia Koshkaroff, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/901,651

(22) Filed: Feb. 21, 2018

(65) Prior Publication Data
US 2018/0242653 A1 Aug. 30, 2018

Related U.S. Application Data

(60) Provisional application No. 62/463,286, filed on Feb. 24, 2017.

(51) Int. Cl.
| | | |
|---|---|---|
| *A41C 3/12* | (2006.01) | |
| *A41C 3/00* | (2006.01) | |
| *A41C 3/08* | (2006.01) | |
| *A41D 7/00* | (2006.01) | |
| *B32B 5/24* | (2006.01) | |

(52) U.S. Cl.
CPC .......... *A41C 3/0057* (2013.01); *A41C 3/0021* (2013.01); *A41C 3/08* (2013.01); *A41C 3/12* (2013.01); *A41D 7/00* (2013.01); *B32B 5/24* (2013.01); *A41D 2400/00* (2013.01); *A41D 2500/30* (2013.01); *B32B 2307/56* (2013.01); *B32B 2437/00* (2013.01)

(58) Field of Classification Search
CPC ........ A41C 3/0057; A41C 3/08; A41C 3/0012

USPC .................................................... 450/93, 39
See application file for complete search history.

(56) References Cited

U.S. PATENT DOCUMENTS

| | | |
|---|---|---|
| 3,478,739 A | 11/1969 | Librande |
| 4,607,640 A | 8/1986 | Mccusker |

(Continued)

FOREIGN PATENT DOCUMENTS

| | | |
|---|---|---|
| JP | 57-34511 U | 2/1982 |
| JP | 11-81735 A | 3/1999 |

(Continued)

OTHER PUBLICATIONS

"Spot Enell sports bra high strength we damping adjustable sports underwear no rims bra large yards," Best Store Online, beststore-online.com, Code: 26499600437, accessed: Sep. 2016; 12 pages.

(Continued)

*Primary Examiner* — Gloria M Hale
(74) *Attorney, Agent, or Firm* — Shook Hardy & Bacon LLP

(57) ABSTRACT

Aspects herein provide for a support garment having a vibration damping structure that is positioned between the breast contacting surfaces of the support garment. The vibration damping structure has a shape and/or material characteristics that enable it to substantially fill the space defined by a medial aspect of the wearer's breasts and the wearer's sternum. This positioning and placement facilitate the damping structure's ability to absorb and dissipate impact forces generated at least through the medial-to-lateral movement of the wearer's breasts during, for example, athletic activities.

12 Claims, 8 Drawing Sheets

(56) References Cited

U.S. PATENT DOCUMENTS

| | | | |
|---|---|---|---|
| 5,244,432 A | | 9/1993 | Moy et al. |
| 6,083,080 A | * | 7/2000 | Lawson .................. A41C 3/10 |
| | | | 450/39 |
| 6,688,942 B2 | * | 2/2004 | Holliday ............. A41C 3/0057 |
| | | | 450/1 |
| 6,723,401 B1 | | 4/2004 | Mcknight et al. |
| 6,755,717 B2 | | 6/2004 | Smith |
| 6,769,955 B1 | | 8/2004 | Fisher |
| 6,880,269 B2 | | 4/2005 | Falone et al. |
| 7,001,239 B2 | * | 2/2006 | Russell .................. A41C 3/005 |
| | | | 2/267 |
| 7,044,829 B1 | | 5/2006 | Jagaric et al. |
| 7,442,110 B2 | * | 10/2008 | Gaudet ............... A41C 3/0057 |
| | | | 450/39 |
| 7,669,251 B2 | | 3/2010 | Hammons et al. |
| 8,047,892 B1 | | 11/2011 | Dempsey |
| 8,075,368 B2 | | 12/2011 | Puyaubreau |
| 8,845,388 B1 | * | 9/2014 | Dempsey ............... A41C 3/005 |
| | | | 450/57 |
| 9,055,771 B2 | | 6/2015 | Deguchi et al. |
| 9,681,691 B1 | * | 6/2017 | Hubbs .................. A41C 3/0014 |
| 2005/0037688 A1 | | 2/2005 | Russell |
| 2007/0155283 A1 | * | 7/2007 | McQueer ............. A41C 3/0057 |
| | | | 450/39 |
| 2007/0190896 A1 | * | 8/2007 | Yu ............................ A41C 3/12 |
| | | | 450/39 |
| 2009/0258571 A1 | | 10/2009 | Tyrer |
| 2013/0316615 A1 | * | 11/2013 | Hurd .................... A41C 3/0057 |
| | | | 450/39 |
| 2014/0287652 A1 | | 9/2014 | Deguchi et al. |
| 2016/0044971 A1 | * | 2/2016 | Randall ................. A41C 3/142 |
| | | | 450/39 |
| 2016/0120235 A1 | | 5/2016 | Scotto |

FOREIGN PATENT DOCUMENTS

| | | |
|---|---|---|
| JP | 2003-202048 A | 7/2003 |
| JP | 2003-278060 A | 10/2003 |
| JP | 2009-52097 A | 3/2009 |
| JP | WO2012133132 A1 | 10/2012 |
| JP | 2014163018 A | 9/2014 |
| KR | 94-8016 Y1 | 11/1994 |
| KR | 10-2013-0056215 A | 5/2013 |
| WO | 02/79558 A1 | 10/2002 |
| WO | 2009/149529 A1 | 12/2009 |
| WO | WO2015048180 A2 | 4/2015 |
| WO | 2015/106620 A1 | 7/2015 |

OTHER PUBLICATIONS

"Sunweb Women Sports Bra Breathable Comfort Underwear Women Seamless Bra Push Up Bra Gym Running Damping Sport Bra Top (Grey)," LAZADA, lazada.com, SKU: OE702SPAA4631TANMY-8284381, accessed: Sep. 2016; 9 pages.

Elliott, Elizabeth, "Find the best sports bra for cycling," BikeRadar, bikeradar.com, May 18, 2015; 7 pages.

International Search Report and Written Opinion dated May 15, 2018 in International Patent Application No. PCT/US2018/019419, 15 pages.

International Preliminary Report on Patentability dated Sep. 6, 2019 in International Patent Application No. PCT/US2018/019419, 8 pages.

Office Action received for Canadian Patent Application No. 3048500, dated Jul. 30, 2020, 4 pages.

Office Action received for European Patent Application No. 18709889.2, dated Oct. 8, 2020, 4 pages.

Summons to Attend Oral Proceedings received for European Patent Application No. 18709889.2, mailed on Jul. 8, 2021, 7 pages.

Office Action received for European Patent Application No. 18709889.2, dated Nov. 19, 2021, 4 pages.

* cited by examiner

SUPPORT GARMENT

CROSS-REFERENCE TO RELATED APPLICATIONS

This application entitled "Support Garment," claims the benefit of priority to U.S. Prov. App. No. 62/463,286, entitled "Support Garment," and filed Feb. 24, 2017. The entirety of the aforementioned application is incorporated by reference herein.

TECHNICAL FIELD

Aspects herein relate to a support garment configured to support a wearer's breasts.

BACKGROUND

Conventional support garments, including those configured to provide support during athletic activities, such as bras, generally provide support through encapsulation and/or compression of a wearer's breasts.

BRIEF DESCRIPTION OF THE DRAWINGS

Examples of the present invention are described in detail below with reference to the attached drawing figures, wherein.

DETAILED DESCRIPTION

Figure 1:
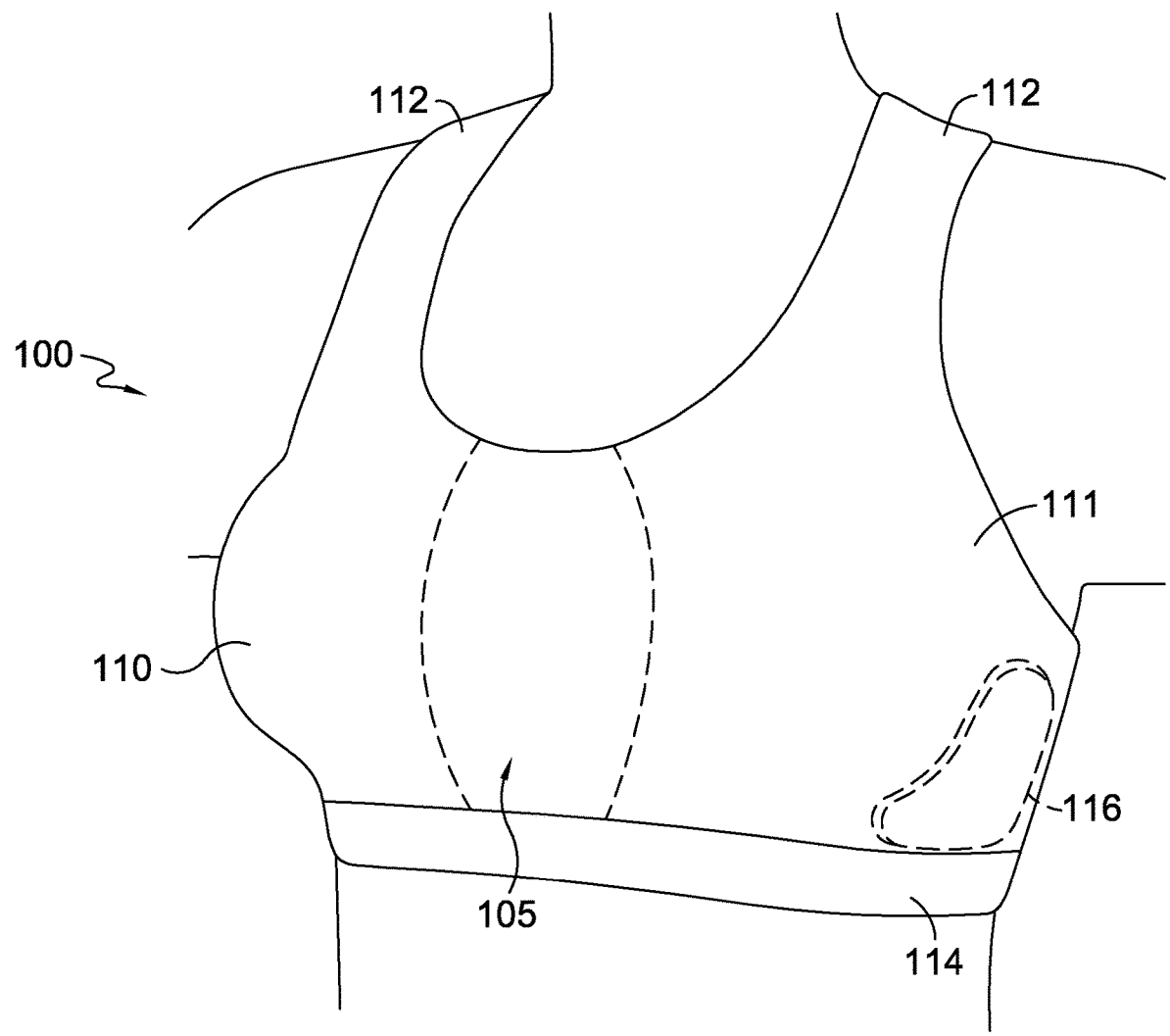
FIG. 1 illustrates a support garment having an exemplary vibration damping structure in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

At a high level, aspects herein relate to a support garment, such as a bra, having a vibration damping structure configured to reduce at least medial-to-lateral sway, movement, or vibration of a wearer's breasts during, for instance, athletic activities. The vibration damping structure may also be configured to reduce superior-to-inferior movement, bounce, or vibration during athletic activities. In exemplary aspects, the support garment comprises breast contacting surfaces configured to cover the wearer's breasts, and the vibration damping structure may be positioned between the breast contacting surfaces. The vibration damping structure has a shape configuration and/or material characteristics such that it is configured to occupy, or at least partially occupy, the space defined at least by the medial aspect of the wearer's breasts and the wearer's sternum (commonly known as the wearer's cleavage).

In exemplary aspects, the vibration damping structure is composed of a material that exhibits mechanical characteristics that facilitate its ability to absorb and dissipate forces transmitted to the material by the wearer's breasts. For instance, the material may be selected to be more compressible (i.e., less stiff) than breast tissue so that the material deforms to a greater extent than the wearer's breast tissue when the wearer's breasts contact the material. This is important for allowing the transmission of the impact force from the wearer's breasts to the material and the subsequent absorption and dissipation of the impact force by the material. An exemplary stiffness for the material may be less than or equal about 15 N/mm. The material may also be selected to exhibit a relatively high rate of energy return (i.e., the percentage of input energy that is recovered during rebound). For example, the material may be selected to exhibit an energy return of from about 70% to about 90%. Having a relatively high percentage of energy return enables the material to "mold" to the shape of the wearer's breasts so that the vibration damping structure not only fills the space between the wearer's breasts but also conforms or molds at least partially around the medial aspects of the wearer's breasts. By being in contact with the wearer's breasts, the vibration damping structure is better able to absorb and dissipate forces generated by the breasts during movement.

Accordingly, aspects herein are directed to a support garment comprising at least a front portion. The front portion comprises a pair of breast contacting surfaces configured to cover a wearer's breasts when the support garment is in an as-worn configuration and a vibration damping structure positioned between the pair of breast contacting surfaces so that when the support garment is in the as-worn configuration the vibration damping structure is configured to occupy a space defined at least by the medial aspect of the wearer's breasts and the wearer's sternum.

Another aspect herein provides for a support garment comprising at least a front portion comprising a pair of breast contacting surfaces configured to cover a wearer's breasts when the support garment is in an as-worn configuration, and a first vibration damping structure positioned between the pair of breast contacting surfaces, where the vibration damping structure has a stiffness less than or equal about 15 N/mm and an energy return characteristic from about 70% to about 90%.

Yet another aspect herein provides for a support garment comprising at least a front portion. The front portion comprises a pair of breast contacting surfaces, each breast contacting surface having an inner-facing surface and an outer-facing surface opposite the inner-facing surface, the inner-facing surface and the outer-facing surface of each breast contacting surface defining a first average thickness therebetween, and a vibration damping structure positioned between the pair of breast contacting surfaces, the vibration damping structure having an inner-facing surface and an outer-facing surface opposite the inner-facing surface, the inner-facing surface and the outer-facing surface of the vibration damping structure defining a second average thickness therebetween, wherein the second average thickness is greater than the first average thickness.

Positional terms used herein such as "superior," "inferior," "medial," "lateral," and the like are to be given their common anatomical meaning with respect to the support garment being worn as intended by a hypothetical wearer standing in anatomical position. The phrase "configured to contact" or other similar phrases as used when describing the location of a structure on the support garment with respect to a wearer is to be construed based on a support garment appropriately sized for the wearer. The term support garment as used herein relates to any style or type of support garment used to support breast tissue. Exemplary support garments may comprise bras as that term is known in the art (sport bras, conventional bras, and the like), camisoles, swimwear, or other garments with built-in support. Further, the term "breast contacting surface" is meant to encompass any type of structure that is in contact with the wearer's breasts. For instance, each breast contacting surface may comprise a breast cup such as a molded cup, or an unmolded cup. The breast contacting surfaces may comprise separate distinct components with each contacting surface configured to cover a separate breast, or the breast contacting surfaces may comprise a unitary or continuous band of material that makes contact with both of the wearer's breasts. Any and all aspects, and any variation thereof, are contemplated as being within aspects herein.

Turning now to FIG. 1, a front perspective view of an exemplary support garment 100 with a vibration damping structure 105 is shown being worn by a wearer in accordance with aspects herein. In exemplary aspects, the support garment 100, shown in the form of a bra, may comprise a pair of breast contacting surfaces 110 and 111 configured to cover a wearer's right and left breasts respectively, a pair of shoulder straps 112 configured to extend over the wearer's shoulders, and an underband 114 configured to be positioned under the wearer's breasts when the support garment 100 is worn. In exemplary aspects, the shoulder straps 112 may be optional. For example, the support garment 100 may be constructed as a bandeau-style garment. Moreover, although shown as a distinct component, the underband 114 may also be optional. For instance, when the support garment 100 is in the form of a top, the underband 114 may not be present or may comprise a bottom margin of the top. Any and all aspects, and any variations thereof, are contemplated as being within aspects herein.

Continuing, although not shown, the support garment 100 further comprises a back portion connected to the front of the support garment 100 via, for instance, the shoulder straps 112 and/or the underband 114 as it extends circumferentially around the torso of a wearer. Further, the back portion of the support garment 100 may be configured as a racerback-style, a conventional style, and the like. Any and all aspects, and any variation thereof, are contemplated as being within aspects herein.

In exemplary aspects, the support garment 100 comprises the vibration damping structure 105 (shown in dashed lines to indicate it is hidden from view). The vibration damping structure 105 is configured to be positioned between the breast contacting surfaces 110 and 111. More particularly, the vibration damping structure 105 is positioned between a medial aspect of the right breast contacting surface 110 and a medial aspect of the left breast contacting surface 111. As will be explained more fully below, the vibration damping structure 105 has a shape configuration and/or has material characteristics that enable it to fill the void or space between the wearer's breasts. That is, the vibration damping structure 105 has a shape configuration and/or has material characteristics that enable it to completely fill or at least substantially fill the space or void defined by at least the medial aspects of the wearer's breasts and the wearer's sternum (i.e., the wearer's cleavage) so that when the support garment 100 is in an as-worn configuration, at least the medial aspects of the wearer's breasts are configured to be in contact with the vibration damping structure 105.

In another aspect, the support garment 100 may also optionally have vibration damping structures 116 positioned at a lateral aspect of the right and left breast contacting surfaces 110 and 111 (only the vibration damping structure 116 adjacent to the lateral aspect of the left breast contacting surface 111 is shown in FIG. 1 due to the perspective view). The vibration damping structures 116 may be used to help absorb and dissipate forces imparted by the wearer's breasts when moving in a lateral direction.

Figure 8:
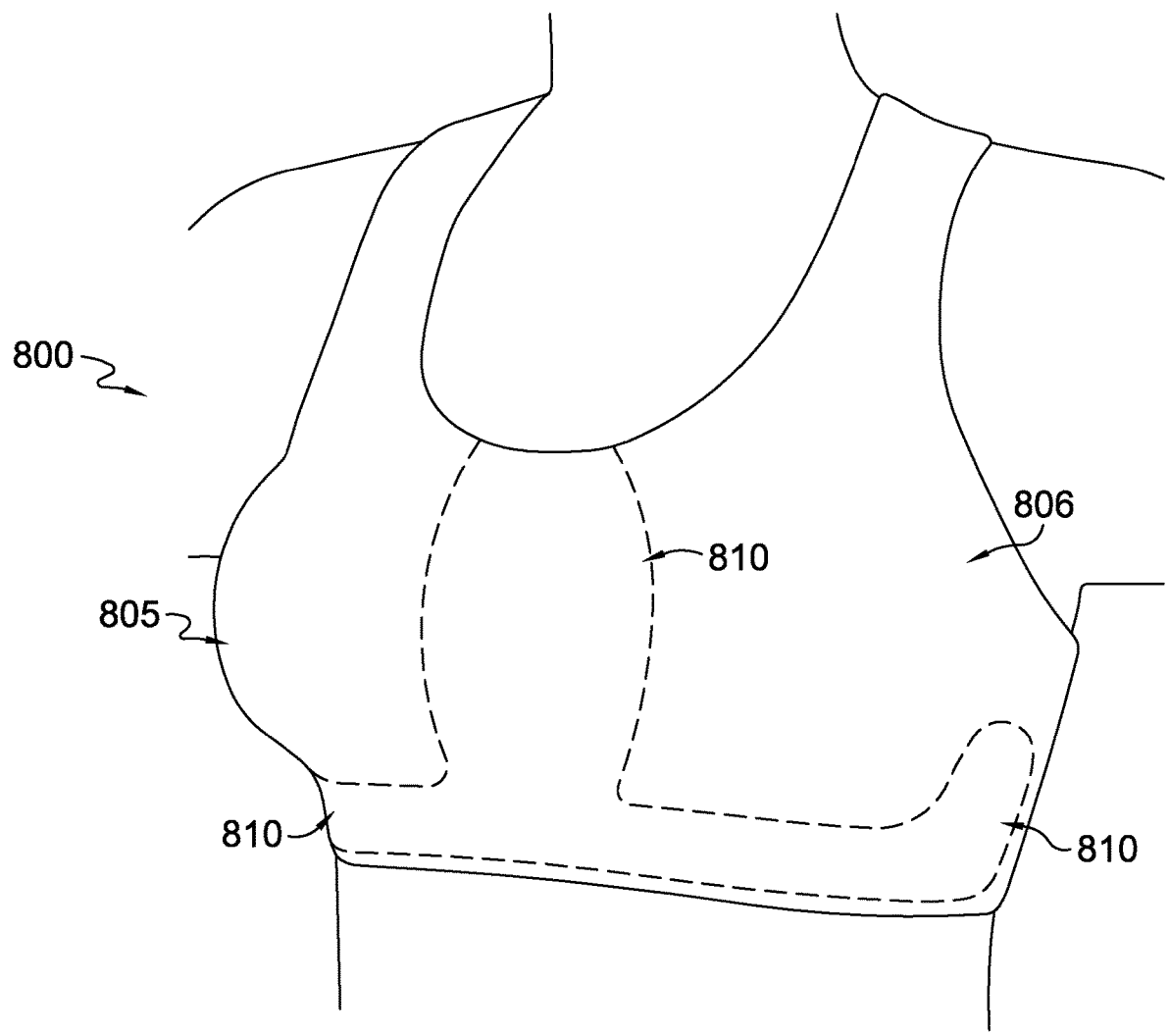
FIGS. 8-9 illustrate additional examples of support garments having exemplary vibration damping structures in accordance with aspects herein.
Figure 9:
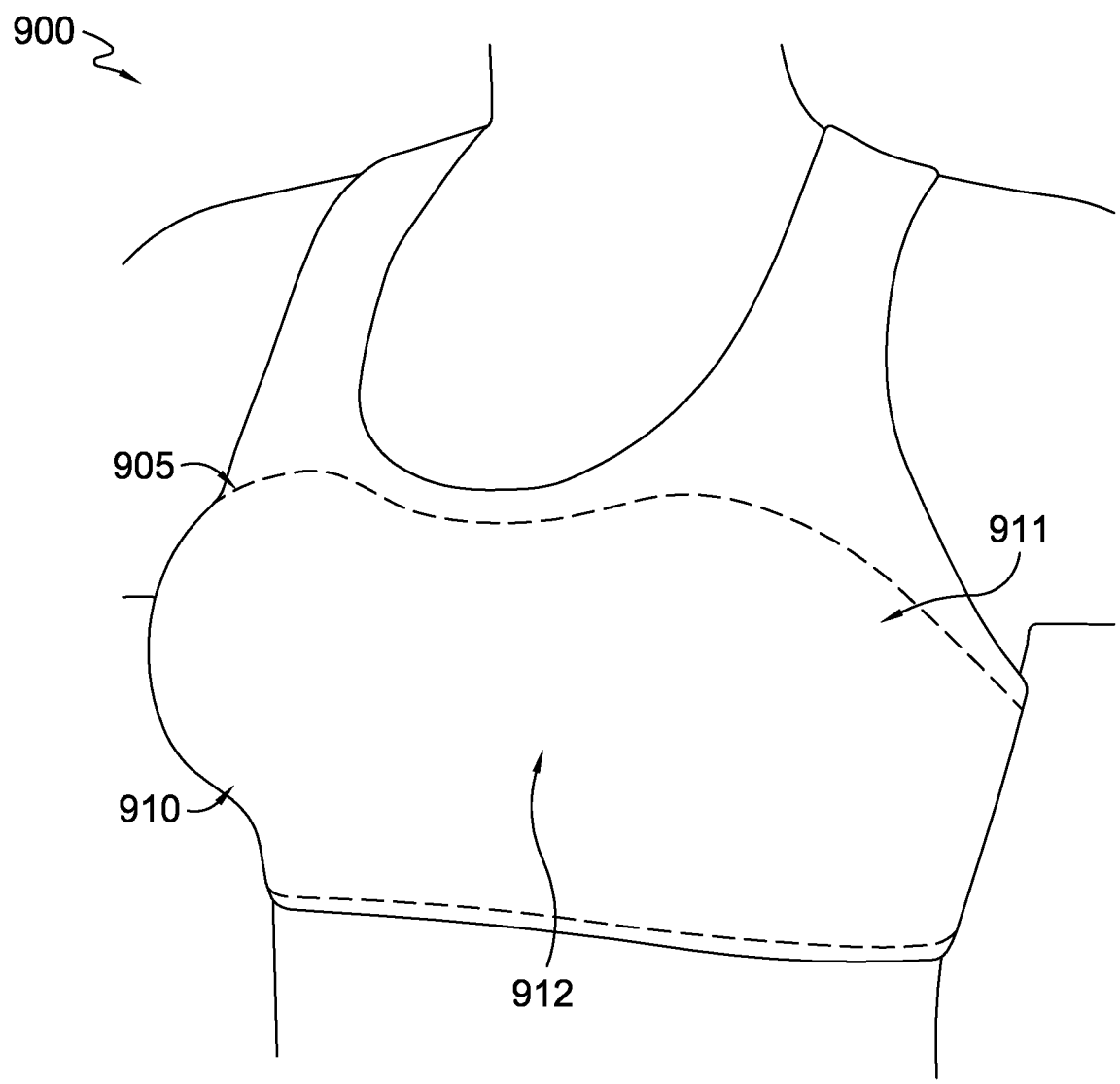

Continuing, and as shown in FIG. 8, in yet another aspect, a support garment 800 may comprise an exemplary vibration damping structure 810 comprising a unitary and continuous structure extending from between breast contacting surfaces 805 and 806, inferior to the breast contacting surfaces 805 and 806 and terminating along the lateral sides of the breast contacting surfaces 805 and 806. In still yet another aspect, and as shown in FIG. 9, a support garment 900 may comprise an exemplary vibration damping structure 905 having a unitary and continuous structure extending across the substantially all of the front portion of the support garment 900 (i.e., between breast contacting surfaces 910 and 911 as indicated by reference numeral 912, across the breast contacting surfaces 910 and 911, and extending over the lateral aspects of the breast contacting surfaces 910 and 911). With respect to the support garment 900, the thickness of the vibration damping structure positioned adjacent to the breast contacting surfaces 910 and 911 is contemplated as being thinner than the thickness of the vibration damping structure positioned between the medial aspects of the breast contacting surfaces 910 and 911 (indicated by reference numeral 912) so as not to substantially increase the overall weight of the bra and/or produce an undesired aesthetic.

Returning to FIG. 1, in exemplary aspects, the vibration damping structure 105 is configured to absorb and dissipate impact forces imparted to the structure 105 by the wearer's breasts as commonly occurs during, for example, athletic activities. The absorption and dissipation of the impact forces may occur through mechanical deformation of the vibration damping structure 105 (i.e., passive damping). More particularly, due to the positioning of the vibration damping structure 105 between the wearer's breasts, the damping structure 105 may be optimized to dissipate impact forces generated through the medial-to-lateral movement of the wearer's breasts. Further, as will be more fully explained below, the vibration damping structure 105 may also have a shape configuration optimized to additionally absorb and dissipate impact forces generated through the superior-to-inferior movement of the wearer's breasts.

Continuing, to be able to both absorb and dissipate the forces, materials for the vibration damping structures 105 and/or 116 are selected to exhibit certain mechanical characteristics. For example, in exemplary aspects, the material selected to form the vibration damping structures 105 and/or 116 may exhibit a stiffness less than or equal to about 15 N/mm (the term "about" as used herein means within ±10% of a given value). Stiffness may be defined as the extent to which a material resists deformation in response to an applied force. In general, the stiffness of the material used to form the vibration damping structures 105 and/or 116 is selected to be less than the average stiffness of breast tissue. As such, the material of the damping structures 105 and/or 116 may be selected to deform (e.g., undergo mechanical deformation) to a greater extent than the breast tissue upon contact of the breast tissue with the material, thereby enabling the material to absorb and/or dissipate any impact forces from the breast tissue. It is contemplated herein, that the stiffness of the material used to form the vibration damping structures 105 and/or 116 may be customized depending on the likely size and/or firmness of the breasts that will be supported by the support garment 100. For example, larger and/or more firmer breasts may generate larger impact forces as compared to smaller breasts. As such, a material with a greater stiffness (e.g., a stiffness between, for instance, from about 7 N/mm to about 15 N/mm) may be selected for support garments configured for large-breasted women and/or woman who may have firmer breast tissue.

Another mechanical characteristic that contributes to the ability of the damping structures 105 and/or 116 to dampen breast vibrations is its energy return where energy return may be defined as the amount of energy stored by the vibration damping structures 105 and/or 116 that is returned when the load is removed (as opposed to dissipating as heat). In exemplary aspects, the material used to form the vibration damping structures 105 and/or 116 is selected to have an energy return from about 70% to about 90%. Having a relatively high rate of energy return may enable the vibration damping structures 105 and/or 116 to conform or mold around a wearer's breasts. For instance, the vibration damping structure 105, due to having a high energy return, may be configured to mold around at least the medial aspect of the wearer's breasts, and the vibration damping structure 116 may be configured to mold around at least a portion of the lateral aspect of the wearer's breasts. This, in turn, facilitates the damping structures 105 and/or 116 being able to absorb and dissipate forces transmitted to the structures 105 and/or 116 by the wearer's breasts.

An additional mechanical property that may be exhibited by the material forming the vibration damping structures 105 and/or 116 is its ability to withstand normal loads or forces imparted by the wearer's breast tissue during impact without plastically deforming. For example, the vibration damping structures 105 and/or 116 may have a maximum limit load of about 10 Newtons (N), 20 N, 30 N, 40 N, 50 N, 60 N, 70 N, 80 N, 90 N, or 100 N (and/or values in between) before undergoing plastic deformation.

Exemplary materials selected to form the vibration damping structures 105 and/or 116 may comprise open cell foams, closed cell foams, spacer mesh materials, spring-like structures (e.g., resilient coil structures), beads (e.g., Styrofoam beads), hollow and flexible pipe structures formed from, for instance, monofilaments and other yarns, non-woven materials such as, for example, Breathair™ manufactured by Toyoba Co., Ltd. of Osaka, Japan, air-filled pillows or bladders, injected molded materials, extruded materials, three-dimensional printed structures, and the like. All of these materials are capable of undergoing some type of mechanical deformation in response to an impact force.

Besides exhibiting the mechanical characteristics described above, materials may also be selected to promote breathability (i.e., the transmission of moisture vapor through a material) of the vibration damping structures 105 and/or 116.

The vibration damping structures 105 and/or 116 may be incorporated into the support garment 100 in a number of ways. In one example, the vibration damping structures 105 and/or 116 may be integrated directly into the support garment 100 by affixing the structures 105 and/or 116 directly to inner-facing surfaces of the breast contacting surfaces 110 and 111 and/or the support garment 100. Affixing may occur by stitching, bonding, adhesives, welding, use of buttons, snaps, hook-and-loop fasteners, and the like. Affixing may comprise permanently or releasably affixing the vibrations damping structures 105 and/or 116 to the support garment 100.

In a second example, the vibration damping structures 105 and/or 116 may be enclosed between layers of fabric, and the layers of fabric may be affixed to inner-facing surfaces of the breast contacting surfaces 110 and 111 and/or support garment 100. In this example, the damping structures 105 and/or 116 may not be directly affixed to the breast contacting surfaces 110 and 111 but, instead, be indirectly affixed to the breast contacting surfaces 110 and 111 via the fabric layers. In yet another example, when the breast contacting surfaces 110 and 111 are formed from two or more layers of fabric, the damping structures 105 and/or 116 may be positioned between the fabric layers. It is contemplated herein, that in one aspect, the fabric selected to form the outer-facing portion of the vibration damping structure 105 may be a non-stretch material so as to limit expansion of the vibration damping structure 105 in an anterior direction. This not only facilitates wearer comfort but may improve the aesthetics of the support garment 100. As well, limiting anterior expansion of the damping structures 105 and/or 116 may help to maintain the overall stiffness and energy return of the damping structures 105 and/or 116.

In another aspect, the vibration damping structures 105 and/or 116 may comprise integral extensions of the breast contacting surfaces 110 and 111. For instance, a knitting, weaving, and/or molding process used to form the breast contacting surfaces 110 and 111 may be modified to form the vibration damping structures 105 and/or 116. In this aspect, the damping structures 105 and/or 116 would comprise one or more of the same yarns or materials used to form the breast contacting surfaces 110 and 111.

Continuing, in yet another aspect, the support garment 100 may comprise pockets into which the vibration damping structures 105 and/or 116 may be inserted when needed. Thus, when the wearer is not engaging in athletic activities, the wearer may choose not to insert the structures 105 and/or 116 into their respective pockets. However, when the wearer engages in athletic activities, the wearer can insert one or both of the structures 105 and/or 116 into their respective pockets. With respect to the vibration damping structure 105, in some aspects, the support garment 100 may comprise straps configured to be positioned over the vibration damping structure 105 when the wearer engages in athletic activities. For instance, in some aspects, the vibration damping structure 105 may be configured to not completely fill the space between the wearer's breasts to improve wearer comfort when the wearer is not exercising. When the wearer wishes to exercise, the wearer can position the straps (or other types of tensioning structures) over an outer-facing surface of the vibration damping structure 105. The tension imparted by the straps helps to position the vibration damping structure 105 so that it substantially fills (e.g., fills about 60%, 70%, 80%, 90%, and/or 100%) the space between the wearer's breasts. Any and all aspects, and any variation thereof, are contemplated as being within aspects herein.

Figure 2:
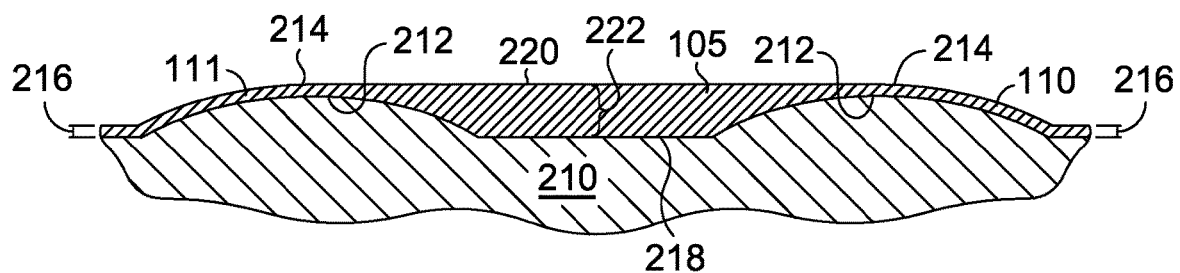
FIGS. 2-4 illustrate exemplary partial cross sections of a support garment having a vibration damping structure as worn by a wearer in accordance with aspects herein.
Figure 3:
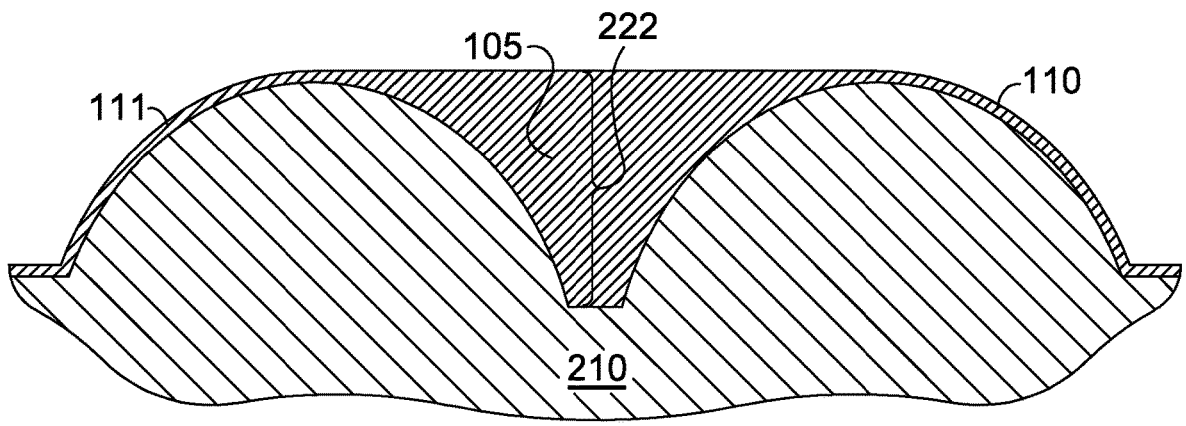
Figure 4:
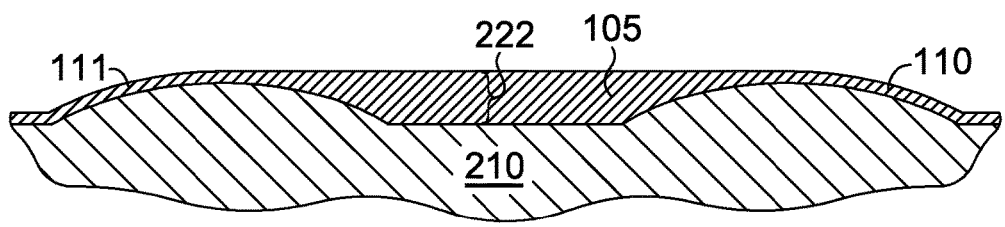

FIGS. 2-4 are provided to illustrate how an exemplary vibration damping structure, such as the vibration damping structure 105 of FIG. 1, is configured to fill, or substantially fill, the space defined by the medial aspects of the wearer's breasts and the wearer's sternum in accordance with aspects herein. FIGS. 2-4 represent partial cross-sections taken at the approximate top (superior part) of the wearer's breasts, the approximate mid-point of the wearer's breasts, and at the approximate lower part (inferior part) of the wearer's breasts respectively. With respect to FIGS. 2-4, the wearer's body is indicated by the reference numeral 210.

Using FIG. 2 as a representative example, in exemplary aspects, each breast contacting surface 110, 111 comprises an inner-facing surface 212 configured to face toward the wearer's body surface 210 and an outer-facing surface 214 configured to face away from the wearer's body surface 210. The inner-facing surface 212 and the outer-facing surface 214 define a first thickness 216 extending between these two surfaces.

Continuing, the vibration damping structure 105 also comprises an inner-facing surface 218 and an outer-facing surface 220. The inner-facing surface 218 and the outer-facing surface 220 of the vibration damping structure 105 define a second thickness 222 extending between the two surfaces 218 and 220. In exemplary aspects, the outer-facing surface 220 of the vibration damping structure 105 may be generally co-planar with the outer-facing surface 214 of the breast contacting surfaces 110 as measured from, for instance, an apex region of the breast contacting surfaces 110 and 111 (the region extending the furthest anteriorly when the support garment 100 is in an as-worn configuration).

In exemplary aspects, the second thickness 222 varies from a superior aspect of the vibration damping structure 105 (best seen in FIG. 2), to an approximate mid-point of the vibration damping structure 105 (best seen in FIG. 3), to an inferior aspect of the vibration damping structure 105 (best seen in FIG. 4) to produce an overall average thickness 222. More particularly, the second thickness 222 may gradually increase from the superior aspect of the damping structure 105 to the approximate mid-point of the vibration damping structure 105 and then gradually decrease from the approximate mid-point of the damping structure 105 to the inferior aspect of the vibration damping structure 105. This gradation in thickness is meant to mimic the normal anatomy of a wearer's cleavage. By varying the second thickness 222 of the vibration damping structure 105 as described, the damping structure 105 can organically fill the space between the wearer's breasts. In exemplary aspects, the average thickness 222 of the vibration damping structure 105 (averaged over the superior, middle, and inferior portions of the structure 105) is greater than the first thickness 216 of the breast contacting surfaces 110 and 111. For instance, the average thickness 222 of the vibration damping structure 105 may be at least about two times, three times, four times, five times, or greater than the thickness of the breast contacting surfaces 110 and 110. This is opposed to most traditional bra structures where the thickness of the center portion that connects the two breast contacting surfaces is generally the same as, or even less than, the thickness of the breast contacting surfaces.

It is contemplated herein that the varying thickness 222 of the vibration damping structure 105 may not be symmetrical with respect to the approximate horizontal mid-point of the damping structure 105. For example, most breasts generally have a greater volume of tissue towards the inferior aspect of the breasts as compared to a superior aspect of the breasts when the wearer is standing. Thus, the thickness of the damping structure 105 may be generally greater at the inferior portion of the vibration damping structure 105 and thinner at the superior portion of the vibration damping structure 105. Any and all aspects, and any variation thereof, are contemplated as being within aspects herein.

Figure 5:
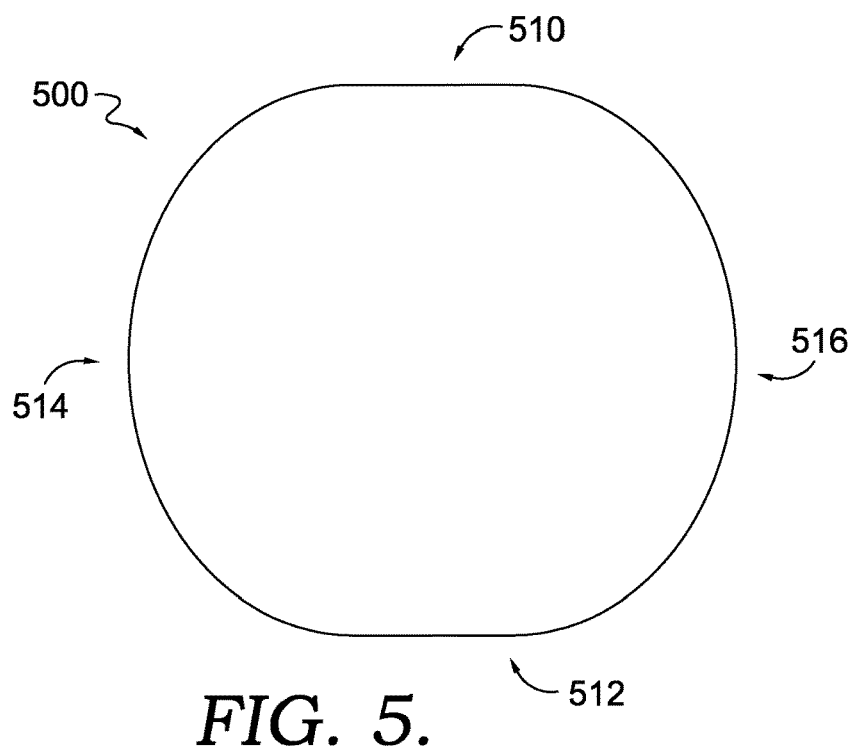
FIGS. 5-6 illustrate exemplary front views of different shape configurations for a vibration damping structure for use in a support garment in accordance with aspects herein.
Figure 6:
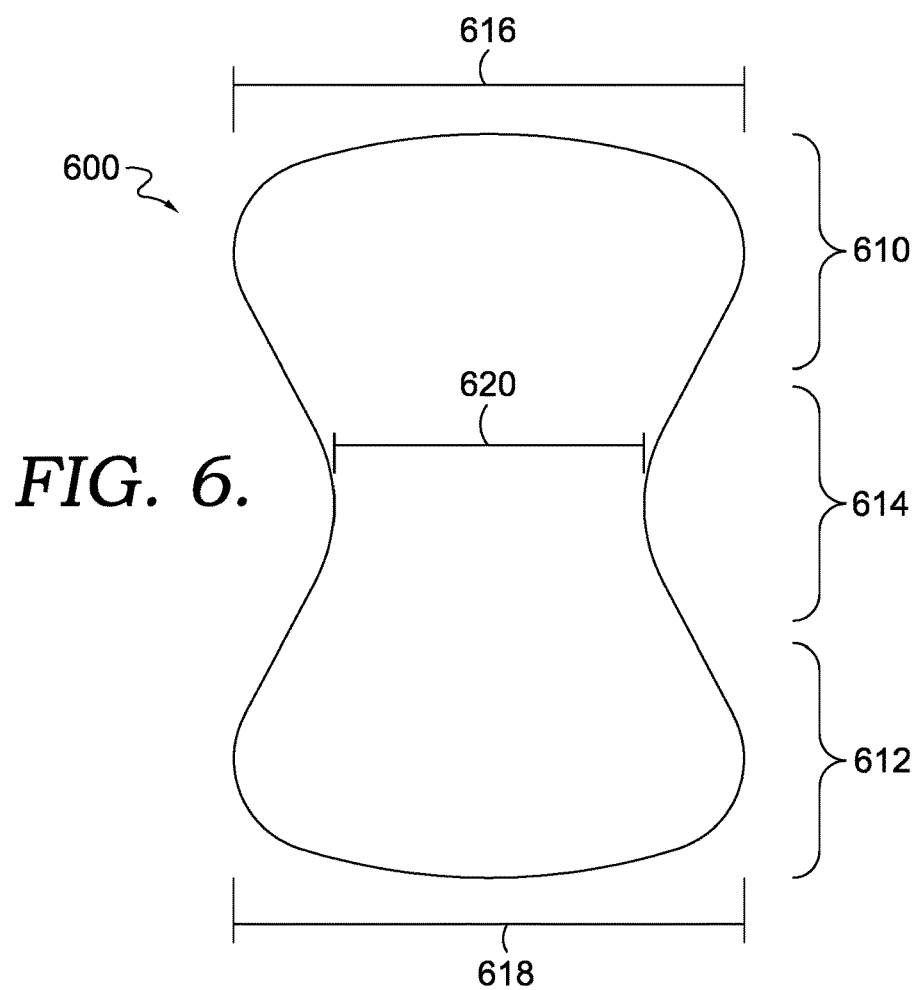
Figure 7:
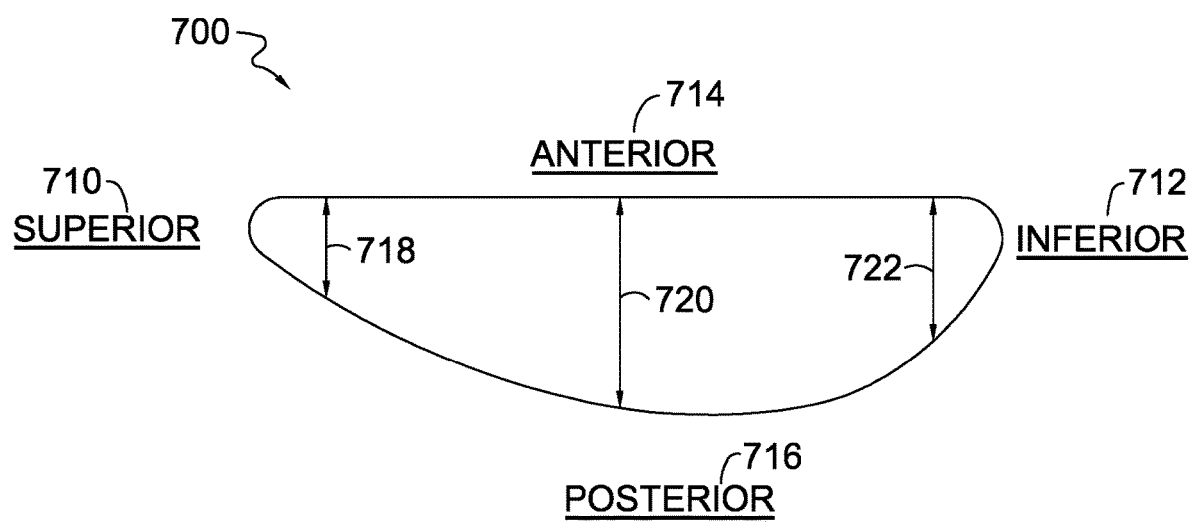
FIG. 7 illustrates an exemplary side view of a vibration damping structure in accordance with aspects herein.

FIGS. 5-7 depict some exemplary shapes for vibration damping structures such as the vibration damping structure 105 in accordance with aspects herein. FIGS. 5-6 depict front views of exemplary vibration damping structures, and FIG. 7 depicts a side view of an exemplary vibration damping structure. With respect to FIG. 5, an exemplary vibration damping structure 500 is defined by a perimeter shape comprising a superior margin 510, an inferior margin 512, and opposing lateral margins 514 and 516. The superior margin 510 is configured to be positioned at a superior aspect of a wearer's breasts, the inferior margin 512 is configured to be positioned at an inferior aspect of the wearer's breasts, and the lateral margins 514 and 516 are configured to be positioned adjacent to a medial aspect of the wearer's breasts. As shown in FIG. 5, the lateral margins 514 and 516 extend convexly away from a vertical midline of the damping structure 500. By extending convexly away from the vertical midline, the lateral margins 514 and 516 may be configured to fully contact the medial aspect of the wearer's breasts when the vibration damping structure 500 is incorporated into a support garment.

FIG. 6 depicts an alternative shape configuration for a vibration damping structure 600 in accordance with aspects herein. The vibration damping structure 600 has a perimeter shape that mimics an hourglass shape. That is, a superior portion 610 and an inferior portion 612 of the damping structure have a greater width than a mid-portion 614 of the structure 600. More particularly, as shown in FIG. 6, width 616 of the superior portion 610 and width 618 of the inferior portion 612 are generally greater than width 620 of the mid-portion 614. It is contemplated herein that the width 616 of the superior portion 610 may be the same as, greater than, or less than the width 618 of the inferior portion 612.

Continuing, the shape configuration of the damping structure 600 may be optimized to provide damping to impact forces generated not only through medial-to-lateral movement of the wearer's breasts but also to impact forces generated through superior-to-inferior movement of the wearer's breasts. For instance, the shape configuration of the structure 600 is such that the superior portion 610 may extend along and be in contact with at least a portion of the superior aspect of the wearer's breasts, and the inferior portion 612 may extend along and be in contact with at least a portion of the inferior aspect of the wearer's breasts. Thus, the superior and inferior portions 610 and 612 may be positioned to help absorb and dissipate impact forces generated by the wearer's breasts during superior-to-inferior movement of the breasts.

FIG. 7 illustrates a side view of an exemplary vibration damping structure 700 in accordance with aspects herein. The vibration damping structure 700 may comprise, for example, the vibration damping structure 105 of FIG. 1 or the vibration damping structures 500 and 600 of FIGS. 5 and 6. The vibration damping structure 700 may comprise a superior aspect 710, an inferior aspect 712, an anterior aspect 714, and a posterior aspect 716 in relation to the damping structure 700 being incorporated into a support garment worn by a wearer. As described above with respect to FIGS. 2-4, the vibration damping structure 700 may a first thickness 718 at its superior aspect 710, a second thickness 720 at a point generally mid-way between the structure's superior aspect 710 and inferior aspect 712, and a third thickness 722 at its inferior aspect 712 to produce an overall average thickness. As shown the thickness towards the mid-point and inferior aspect 712 of the structure 700 is generally greater than the thickness 718 at the superior aspect 710 to mimic the natural breast shape of the wearer's breasts. It is contemplated herein, that the structure 700 may have other configurations. For instance, the thickness of the superior and inferior aspects 710 and 712 may be generally the same, where both of these thicknesses may be less than the thickness 720. Alternatively, the structure 700 may have a uniform thickness from its superior aspect 710 to its inferior aspect 712. Any and all aspects, and any variation thereof, are contemplated as being within the scope herein.

Figure 10:
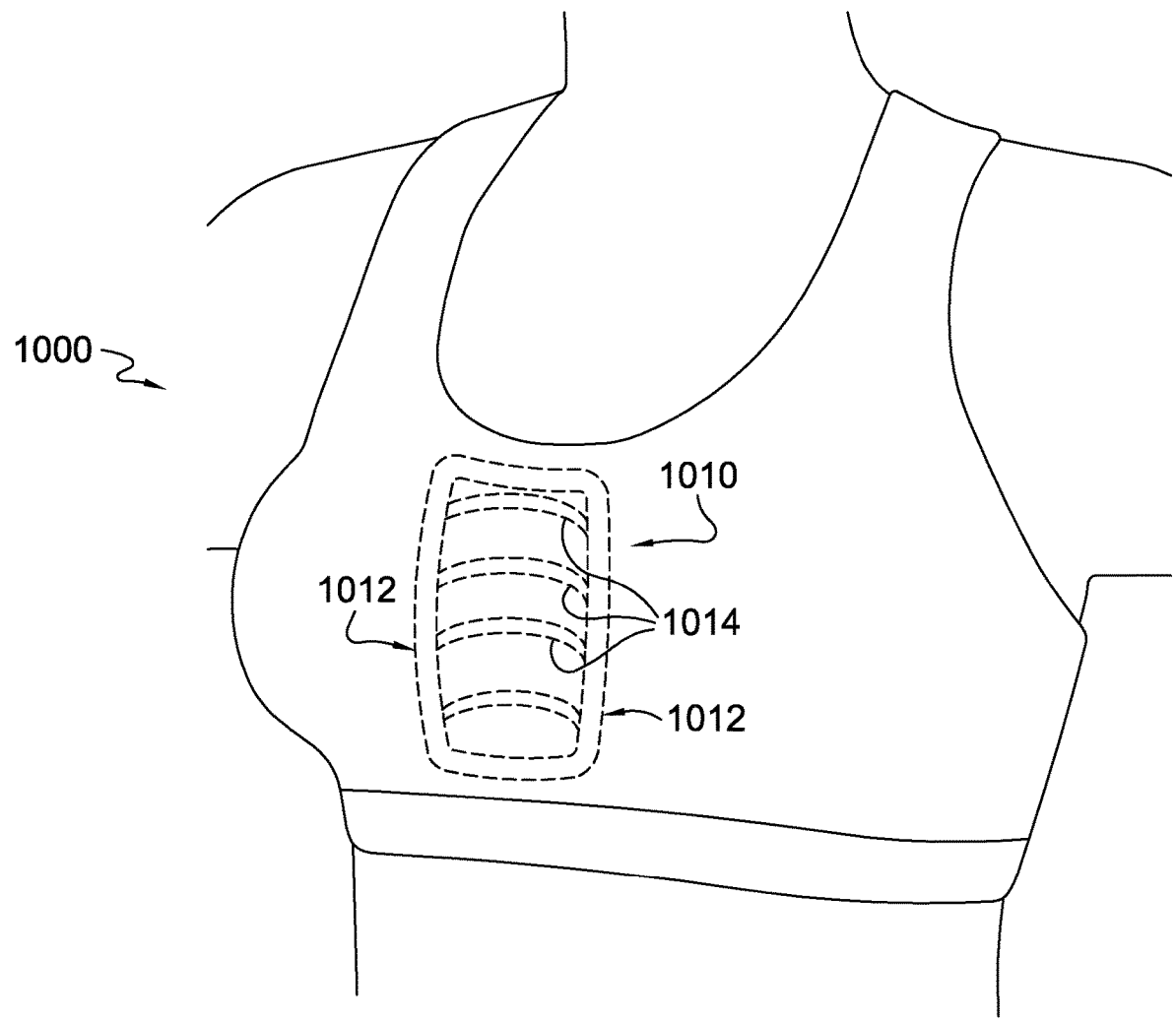
FIG. 10 illustrates a support garment having an alternative exemplary vibration damping structure in accordance with aspects herein.
Figure 11:
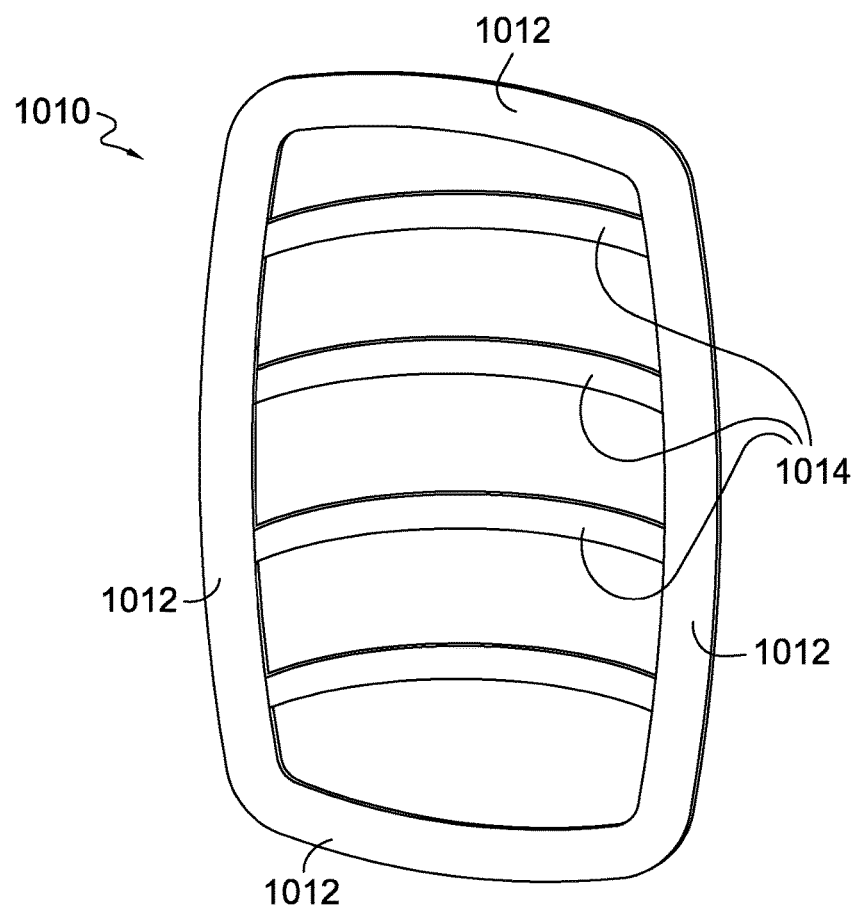
FIG. 11 depicts a front perspective view of the exemplary vibration damping structure of FIG. 10 in accordance with aspects herein.
Figure 12:
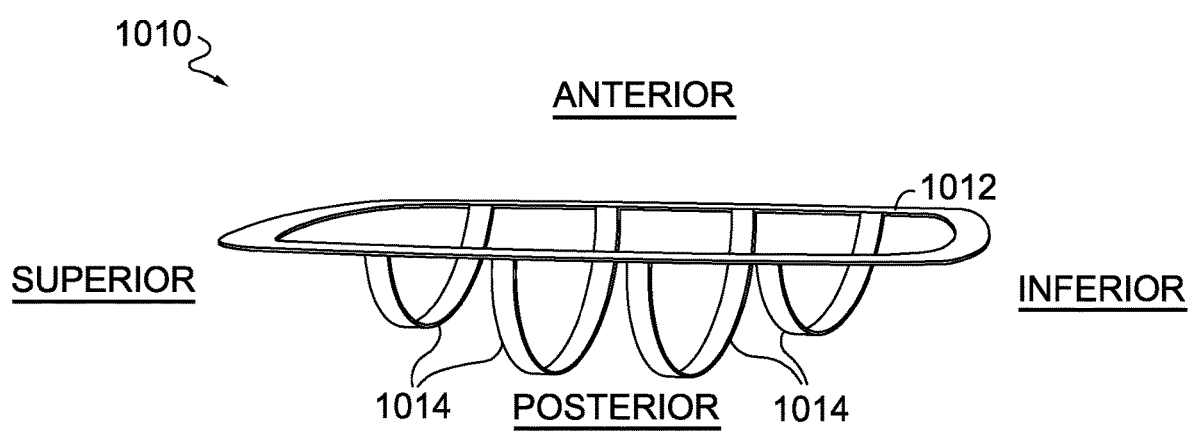
FIG. 12 depicts a side view of the exemplary vibration damping structure of FIG. 11 in accordance with aspects herein.

Turning now to FIGS. 10-12, an alternative construction for a vibration damping structure is depicted in accordance with aspects herein. In an additional aspect, and as shown in FIG. 10, a support garment 1000 may comprise an exemplary vibration damping structure 1010 comprising a frame 1012 and a series of series of cross-linking elements 1014 extending between the borders of the frame 1012. The frame 1012 and the cross-linking elements 1014 may have similar mechanical properties as described for the vibration damping structures 105 and 116. As shown in FIG. 10, the vibration damping structure 1010 is positioned between breast contacting surfaces of the support garment 1000 such that is fills or substantially fills the space defined by the medial aspects of the wearer's breasts and the wearer's sternum when the support garment 1000 is in an as-worn configuration. It is contemplated herein, that the vibration damping structure 1010 may be fixedly attached to the support garment 1000 or removably attached to the support garment 1000. Any and all aspects, and any variation thereof, are contemplated as being within aspects herein.

A view of the vibration damping structure 1010 in isolation is shown in FIGS. 11 and 12. With respect to FIG. 11, which illustrates a front perspective view of the vibration damping structure 1010, it is contemplated herein that the frame 1012 may extend continuously around the vibration damping structure 1010. That is, it may extend continuously from a superior end of the vibration damping structure 1010, along lateral sides of the vibration damping structure 1010, and along the inferior end of the vibration damping structure. It is also contemplated herein, that the frame 1012 may comprise the lateral sides without the superior and inferior ends. The frame 1012 may be formed of, for instance a flexible plastic material (commonly known as "boning") although other flexible materials are contemplated herein.

Continuing, the series of cross-linking elements 1014 extend transversely across the frame 1012 from a first lateral side of the frame 1012 to a second lateral side of the frame 1012. In exemplary aspects, the cross-linking elements 1014 may also be formed from a flexible plastic material (or other flexible material). Further, it is contemplated herein that the frame 1012 and the cross-linking elements 1014 may comprise a unitary and continuous structure formed through, for instance, a molding process. It is also contemplated herein, that the cross-linking elements 1014 may comprise separate structures that are joined to the frame 1012 using affixing technologies know in the art. Any and all aspects, and any variation thereof, are contemplated as being within aspects herein. When the vibration damping structure 1010 is used within a support garment such as the support garment 1000, it is contemplated herein that the vibration damping structure may be sandwiched between or positioned between layers of material (e.g., a fabric) before being incorporated into the support garment.

As shown in FIGS. 10 and 12, the cross-linking elements 1014 extend posteriorly with respect to the frame 1012 such that they bow or curve inwardly to at least partially occupy the space defined by the medial aspect of the wearer's breasts and the wearer's sternum. Similar to the vibration damping structure 700 of FIG. 7, it is contemplated herein that cross-linking elements 1014 positioned near the superior end of the vibration damping structure 1010 may not extend as far posteriorly as the cross-linking elements 1014 positioned generally midway between the superior and inferior ends of the vibration damping structure 1010, or the cross-linking elements 1014 positioned near the inferior end of the vibration damping structure 1010. As well, the cross-linking elements 1014 positioned near the inferior end of the vibration damping structure 1010 may not extend as far posteriorly as the cross-linking elements 1014 positioned generally midway between the superior and inferior ends of the vibration damping structure 1010. Any and all aspects, and any variation thereof, are contemplated as being within aspects herein. The configuration of the vibration damping structure 1010 not only helps to prevent medial-to-lateral sway of the wearer's breasts during movement, but also facilitates the movement of air and moisture vapor through the vibration damping structure 1010 helping to keep the wearer cool.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A support garment comprising:
a front portion comprising:
a pair of breast contacting surfaces that contact a wearer's breats in an as-worn configuration,
a vibration damping structure positioned entirely between the pair of breast contacting surfaces so that when the support garment is in the as-worn configuration the vibration damping structure is configured to occupy a space defined at least by a medial aspect of a wearer's breasts and the wearer's sternum, and
a second vibration damping structure distinct and separate from the first vibration damping structure and positioned at a lateral aspect of each of the pair of breast contacting surfaces.

2. The support garment of claim 1, wherein the vibration damping structure comprises a material that exhibits a stiffness of about 15 N/mm.

3. The support garment of claim 2, wherein the material exhibits an energy return of from about 70% to about 90%.

4. The support garment of claim 1, wherein the front portion further comprises a pocket positioned between the pair of breast contacting surfaces, and wherein the vibration damping structure is removably positioned within the pocket.

5. The support garment of claim 1, further comprising at least a first layer of material and at least a second layer of material, wherein the vibration damping structure is positioned between the first layer of material and the second layer of material.

6. The support garment of claim 1, wherein the vibration damping structure is directly affixed to an inner-facing surface of the front portion.

7. The support garment of claim 1, wherein the vibration damping structure comprises one or more of a closed cell foam, an open cell foam, a spacer mesh material, a nonwoven material, one or more tubular structures, a plurality of beads, and one or more spring structures.

8. A support garment comprising:
a front portion comprising:
a pair of breast contacting surfaces,
a first vibration damping structure positioned entirely between the pair of breast contacting surfaces, the first vibration damping structure having a stiffness of about 15 N/mm and an energy return characteristic from about 70% to about 90%, and
a second vibration damping structure distinct and separate from the first vibration damping structure and positioned at a lateral aspect of each of the pair of breast contacting surfaces.

9. The support garment of claim 8, wherein the first vibration damping structure has a shape configuration such that at least one of a superior and inferior portion of the first vibration damping structure has a larger width than a mid-point between the superior and inferior portions of the first vibration damping structure.

10. The support garment of claim 8, wherein the first vibration damping structure has a shape configuration such that superior and inferior portions of the first vibration damping structure have a smaller width than a mid-point between the superior and inferior portions of the first vibration damping structure.

11. The support garment of claim 8, wherein the second vibration damping structure has a stiffness of about 15 N/mm and an energy return characteristic from about 70% to about 90%.

12. The support garment of claim 8, wherein when the support garment is in an as-worn configuration, the first vibration damping structure is configured to occupy a space defined by a medial aspect of the wearer's breasts and the wearer's sternum.

* * * * *

UNITED STATES PATENT AND TRADEMARK OFFICE
CERTIFICATE OF CORRECTION

PATENT NO. : 11,317,658 B2
APPLICATION NO. : 15/901651
DATED : May 3, 2022
INVENTOR(S) : Baron C. Brandt, Daniela Grogro and Iustinia Koshkaroff Page 1 of 1

It is certified that error appears in the above-identified patent and that said Letters Patent is hereby corrected as shown below:

In the Claims

- Column 10, Line 47: In Claim 1, delete "breats" and insert -- breasts --.
- Column 10, Line 52: In Claim 1, delete "a wearer's" and insert -- the wearer's --.

Signed and Sealed this
Fifth Day of July, 2022

Katherine Kelly Vidal
*Director of the United States Patent and Trademark Office*